(12) United States Patent
Sekiguchi et al.

(10) Patent No.: US 9,235,001 B2
(45) Date of Patent: Jan. 12, 2016

(54) OPTICAL DEVICE AND OPTICAL MODULE

(71) Applicant: FUJITSU LIMITED, Kawasaki-shi, Kanagawa (JP)

(72) Inventors: Shigeaki Sekiguchi, Zama (JP); Nobuhiro Imaizumi, Atsugi (JP); Toshiya Akamatsu, Zama (JP); Shinji Tadaki, Atsugi (JP); Akinori Hayakawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/686,999

(22) Filed: Apr. 15, 2015

(65) Prior Publication Data

US 2015/0323738 A1    Nov. 12, 2015

(30) Foreign Application Priority Data

May 8, 2014   (JP) .................................. 2014-096995

(51) Int. Cl.
  *G02B 6/12* (2006.01)
  *G02B 6/42* (2006.01)
  *G02B 6/43* (2006.01)

(52) U.S. Cl.
  CPC ........ *G02B 6/12004* (2013.01); *G02B 6/12002* (2013.01); *G02B 6/426* (2013.01); *G02B 6/4295* (2013.01); *G02B 6/43* (2013.01); *G02B 2006/12085* (2013.01); *G02B 2006/12123* (2013.01); *G02B 2006/12138* (2013.01); *G02B 2006/12142* (2013.01)

(58) Field of Classification Search
  None
  See application file for complete search history.

(56) References Cited

U.S. PATENT DOCUMENTS

2007/0210400 A1   9/2007  Moribayashi et al.
2009/0242258 A1*  10/2009  So ........................ H01L 23/4006
                                                174/260
2011/0108716 A1   5/2011  Shiraishi

FOREIGN PATENT DOCUMENTS

| JP | 3371954 | 1/2003 |
| JP | 2007-249194 | 9/2007 |
| JP | 2011-107206 | 6/2011 |

OTHER PUBLICATIONS

Pan et al., "High-speed receiver based on waveguide germanium photodetector wire-bonded to 90nnn SOI CMOS amplifier" Optics Express 18145, vol. 20, No. 16, pp. 18145-18155, Jul. 30, 2012.
Zheng et al., "Ultralow Power 80 Gbls Arrayed CMOS Silicon Photonic Transceivers for WDM Optical Links", Journal of Lightwave Technology, vol. 30, No. 4, pp. 641-650, Feb. 15, 2012.

* cited by examiner

*Primary Examiner* — Jerry Blevins
*Assistant Examiner* — Erin Chiem
(74) *Attorney, Agent, or Firm* — Fujitsu Patent Center

(57) ABSTRACT

An optical device includes: an optical integrated circuit chip that comprises an optical integrated circuit and an optical interface connected thereto; an electronic circuit chip that comprises an electronic circuit connected to the optical integrated circuit; a through wiring board that comprises a through wiring connected to the electronic circuit chip; a first bump that connects the optical integrated circuit and the electronic circuit between the optical integrated circuit chip and the electronic circuit chip; a second bump that connects the electronic circuit and the through wiring between the electronic circuit chip and the through wiring board; and a third bump connected to an end portion on an opposite side to the second bump of the through wiring. The optical integrated circuit chip and the through wiring board are disposed on a side of a first main surface of the electronic circuit chip. A first distance between the first main surface and a second main surface of the optical integrated circuit chip, the second main surface being on an opposite side to the electronic circuit chip, is equal to or smaller than a second distance between the first main surface and a vertex of the third bump, the vertex being on an opposite side to the electronic circuit chip.

7 Claims, 13 Drawing Sheets

OPTICAL DEVICE AND OPTICAL MODULE

CROSS-REFERENCE TO RELATED APPLICATION

This application is based upon and claims the benefit of priority of the prior Japanese Patent Application No. 2014-096995, filed on May 8, 2014, the entire contents of which are incorporated herein by reference.

FIELD

The embodiments discussed herein are directed to an optical device and an optical module.

BACKGROUND

A silicon process, where an electronic circuit can be constructed and an inexpensive and large-scale integration technique is in progress, may be applied to an optical device. Application of the silicon process to the optical device can materialize a large-scale optical system which includes a driver and an inexpensive optical device by mass production. An optical device may be used for an optical communication network, an optical interconnection, and so on.

In a silicon optical integrated circuit chip being one of optical devices, elements such as an optical modulator, a light receiver, and a passive element are formed at a high density on a silicon substrate. A driving circuit chip is connected to the silicon optical integrated circuit chip and the driving circuit chip is connected to a circuit board. Conventionally, a bonding wire is used in part of such connection, and thus it is difficult to materialize a high-speed operation and high integration of multiple channels.

It is also discussed to mount a silicon optical integrated circuit on a mount board such as a circuit board processed into a predetermined shape while the silicon optical integrated circuit being connected to the mount board with a flip chip bump. However, in the prior art, it is required to process the mount board at a high accuracy, materialization of which is difficult and which leads to cost increase. In other words, loose connection occurs when a processing accuracy is not high, and thus modularization is difficult.

Patent Literature 1: Japanese Patent No. 3371954
Patent Literature 2: Japanese Laid-open Patent Publication No. 2011-107206
Patent Literature 3: Japanese Laid-open Patent Publication No. 2007-249194
Non-Patent Literature 1: Pan et al., Opt. Express, Vol. 20(16), 18145-18155
Non-Patent Literature 2: Zheng et al., J. Lightwave Technology, 2012, Vol. 30(4), 641-650

SUMMARY

According to an aspect of the embodiments, an optical device includes: an optical integrated circuit chip that comprises an optical integrated circuit and an optical interface connected thereto; an electronic circuit chip that comprises an electronic circuit connected to the optical integrated circuit; a through wiring board that comprises a through wiring connected to the electronic circuit chip; a first bump that connects the optical integrated circuit and the electronic circuit between the optical integrated circuit chip and the electronic circuit chip; a second bump that connects the electronic circuit and the through wiring between the electronic circuit chip and the through wiring board; and a third bump connected to an end portion on an opposite side to the second bump of the through wiring. The optical integrated circuit chip and the through wiring board are disposed on a side of a first main surface of the electronic circuit chip. A first distance between the first main surface and a second main surface of the optical integrated circuit chip, the second main surface being on an opposite side to the electronic circuit chip, is equal to or smaller than a second distance between the first main surface and a vertex of the third bump, the vertex being on an opposite side to the electronic circuit chip.

According to another aspect of the embodiments, an optical module includes: a circuit board; and an optical device mounted on the circuit board. The optical device includes: an optical integrated circuit chip that comprises an optical integrated circuit and an optical interface connected thereto; an electronic circuit chip that comprises an electronic circuit connected to the optical integrated circuit; a through wiring board that comprises a through wiring connected to the electronic circuit chip; a first bump that connects the optical integrated circuit and the electronic circuit between the optical integrated circuit chip and the electronic circuit chip; a second bump that connects the electronic circuit and the through wiring between the electronic circuit chip and the through wiring board; and a third bump connected to an end portion on an opposite side to the second bump of the through wiring. The optical integrated circuit chip and the through wiring board are disposed on a side of a first main surface of the electronic circuit chip. A first distance between the first main surface and a second main surface of the optical integrated circuit chip, the second main surface being on an opposite side to the electronic circuit chip, is equal to or smaller than a second distance between the first main surface and a vertex of the third bump, the vertex being on an opposite side to the electronic circuit chip. The third bump is connected to the circuit board. An underfill material is provided between the second main surface and the circuit board.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, embodiments will be concretely described with reference to the attached drawings.

First Embodiment

Figure 1A:
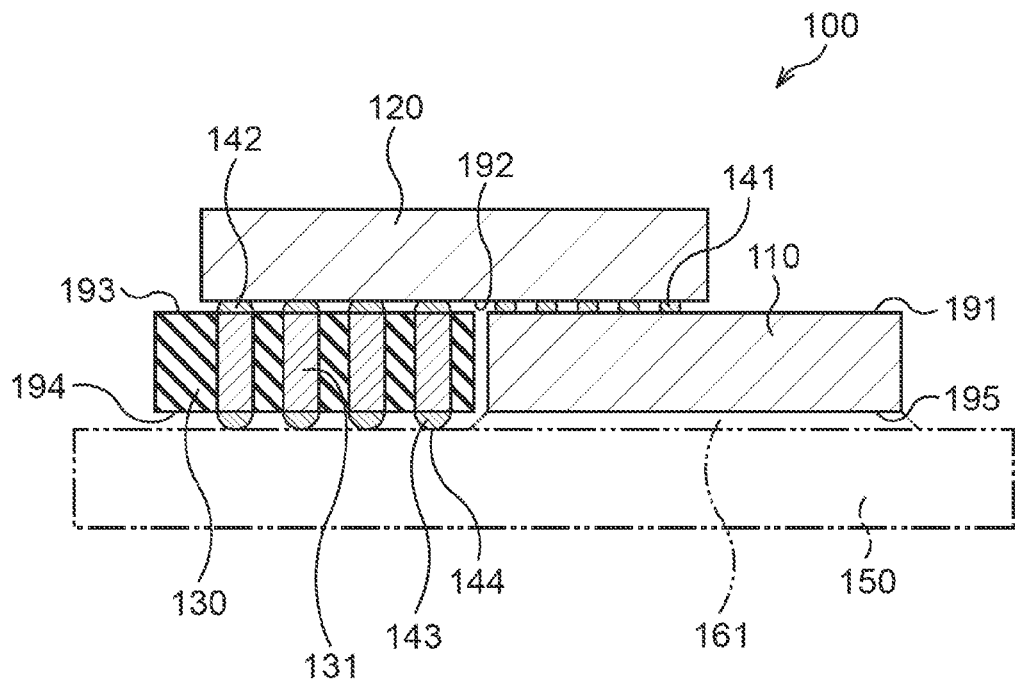
FIG. 1A and FIG. 1B are diagrams illustrating a configuration of an optical device according to a first embodiment.
Figure 1B:
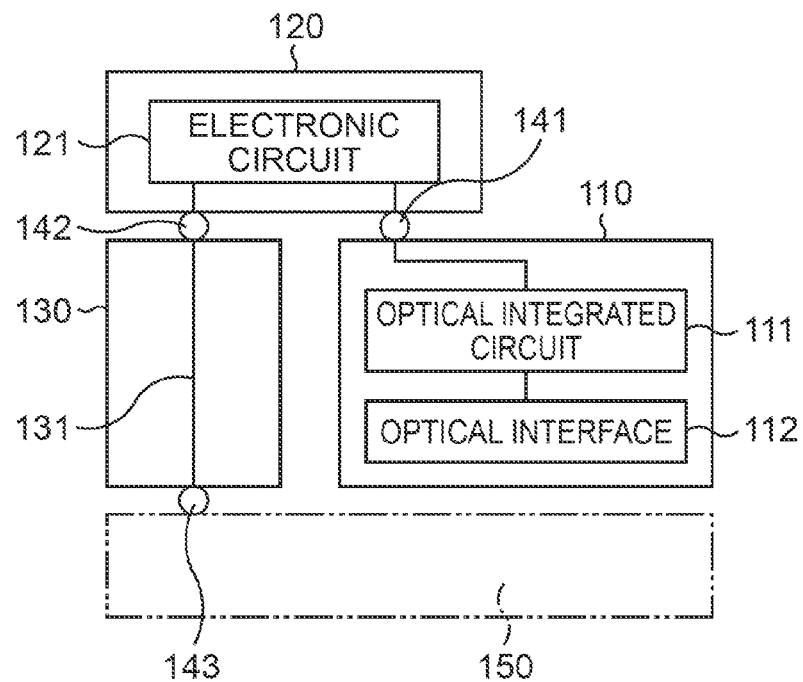

First, a first embodiment will be described. FIG. 1A and FIG. 1B are diagrams illustrating a configuration of an optical device according to the first embodiment. FIG. 1A is a partial cross-sectional view, while FIG. 1B is a circuit diagram.

An optical device 100 according to a first embodiment includes an optical integrated circuit chip 110, an electronic circuit chip 120, and a through wiring board 130, as illustrated in FIG. 1A and FIG. 1B. The optical integrated circuit chip 110 and the electronic circuit chip 120 are connected by a bump 141. The electronic circuit chip 120 and the through wiring board 130 are connected by a bump 142. The bump 141 is on a main surface 191 of the optical integrated circuit chip 110 and on a main surface 192 of the electronic circuit chip 120. The bump 142 is on the main surface 192 of the electronic circuit chip 120 and on a main surface 193 of the through wiring board 130. The optical integrated circuit chip 110 includes an optical integrated circuit 111 and an optical interface 112 connected to the optical integrated circuit 111. The optical integrated circuit 111 is connected to the bump 141. The electronic circuit chip 120 includes an electronic circuit 121. The electronic circuit 121 is connected to the bump 141 and the bump 142. The through wiring board 130 includes a through wiring 131. The through wiring 131 is connected to the bump 142. A bump 143 connected to the through wiring 131 is on the other main surface 194 of the through wiring board 130. A distance L1 between the main surface 192 and the other main surface 195 of the optical integrated circuit chip 110 is equal to or smaller than a distance L2 between the main surface 192 and a vertex 144 of the bump 143. The bump 141 is an example of a first bump, the bump 142 is an example of a second bump, and the bump 143 is an example of a third bump. The main surface 192 is an example of a first main surface, and the main surface 195 is an example of a second main surface. The distance L1 is an example of a first distance, and the distance L2 is an example of a second distance.

The optical device 100 is used while being mounted on a circuit board 150 in a manner that the bump 143 is in contact with the circuit board 150, as illustrated in FIG. 1A and FIG. 1B. Since the distance L1 is equal to or smaller than the distance L2, it is possible to insert an underfill material 161 between the main surface 195 and the circuit board 150, and it is possible to surely connect all the bumps 143 to the circuit board 150.

As described above, according to the first embodiment, the optical device 100 can be easily mounted on the circuit board 150, even without performing highly accurate processing of the circuit board 150. Since the optical integrated circuit chip 110, the electronic circuit chip 120, and the through wiring board 130 are connected with the bump 141, the bump 142, and the bump 143 instead of bonding wires, a degree of integration and an operation speed can be improved.

Second Embodiment

Figure 2:
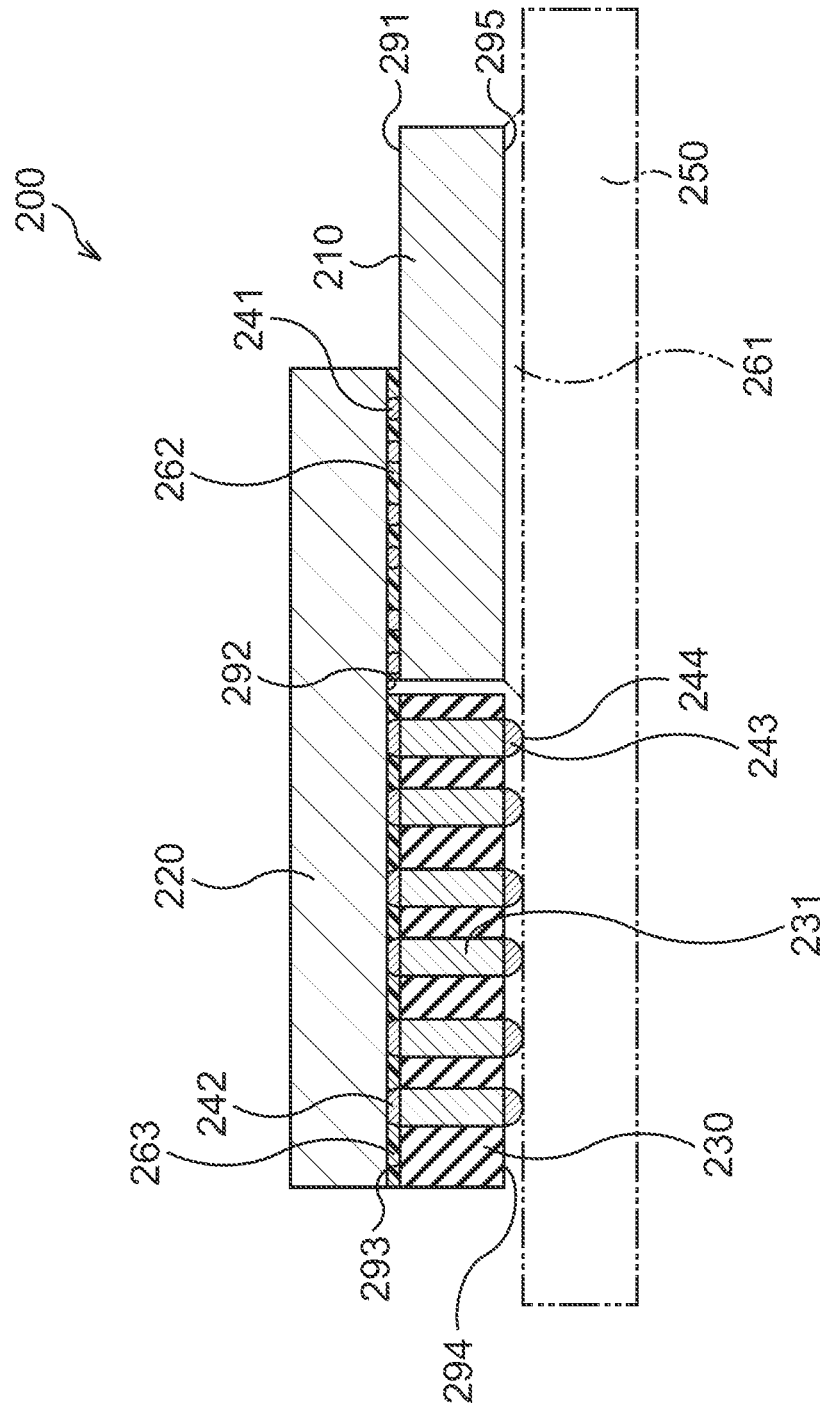
FIG. 2 is a diagram illustrating a configuration of an optical device according to a second embodiment.

Next, a second embodiment will be described. FIG. 2 is a diagram illustrating a configuration of an optical device according to the second embodiment.

An optical device 200 according to the second embodiment includes an optical integrated circuit chip 210, an electronic circuit chip 220, and a through wiring board 230, as illustrated in FIG. 2. The optical integrated circuit chip 210 and the electronic circuit chip 220 are connected by a bump 241. The electronic circuit chip 220 and the through wiring board 230 are connected by a bump 242. The bump 241 is on a main surface (upper surface) 291 of the optical integrated circuit chip 210 and on a main surface (lower surface) 292 of the electronic circuit chip 220. The bump 242 is on the main surface 292 (lower surface) of the electronic circuit chip 220 and on a main surface (upper surface) 293 of the through wiring board 230. An underfill material 262 is between the main surface 291 and the main surface 292, and an underfill material 263 is between the main surface 292 and the main surface 293.

Figure 3:
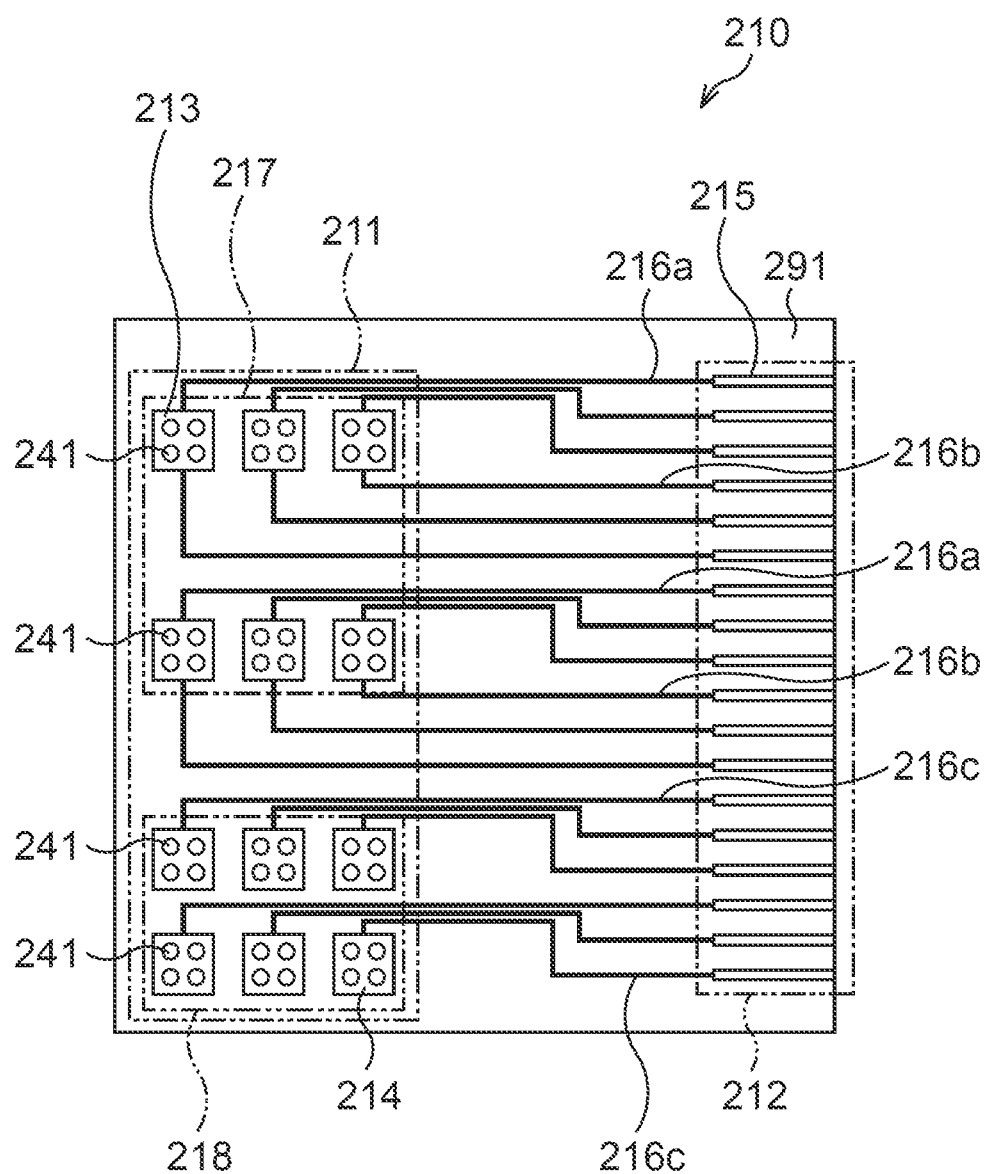
FIG. 3 is a diagram illustrating a configuration of an optical integrated circuit chip in the second embodiment.

As illustrated in FIG. 3, the optical integrated circuit chip 210 includes an optical integrated circuit 211 that includes a plurality of modulators 213 and a plurality of light receivers 214, and an optical interface 212 that includes a plurality of spot-size converters 215. The modulators 213 are included in a modulator section 217, and disposed in an array in the modulator section 217. The light receivers 214 are included in a light receiver section 218, and disposed in an array in the light receiver section 218. The bumps 241 are connected to the modulators 213 and the light receivers 214 on the main surface 291 side. Each of the modulators 213 includes an input port of light and an output port of light, an end of a waveguide 216a is connected to the input port, and an end of a waveguide 216b is connected to the output port. Each of the light receivers 214 includes an input port of light, and an end of a waveguide 216c is connected to the input port. The other ends of the waveguide 216a, the waveguide 216b, and the waveguide 216c are connected to the spot-size converters 215.

The modulators 213, the light receivers 214, the spot-size converters 215, and the waveguides 216a to 216c are formed on a substrate that contains silicon, for example, on an SOI (silicon on insulator) substrate with a thickness of about 530 μm. The modulator 213 is a modulator of a ring resonator type, for example, and the light receiver 214 is a light receiver of a waveguide type whose absorbing layer is of Ge, for example. The spot-size converter 215 includes a waveguide made of SiON whose refractive index is 1.47, for example, and shifts light from the silicon waveguides 216a to 216c and inputs/outputs light from an end surface. The present embodiment may be configured so that the modulators 213, the light receivers 214, the spot-size converters 215, and the waveguides 216a to 216c operate on a light of a 1550 nm band, for example.

Figure 4:
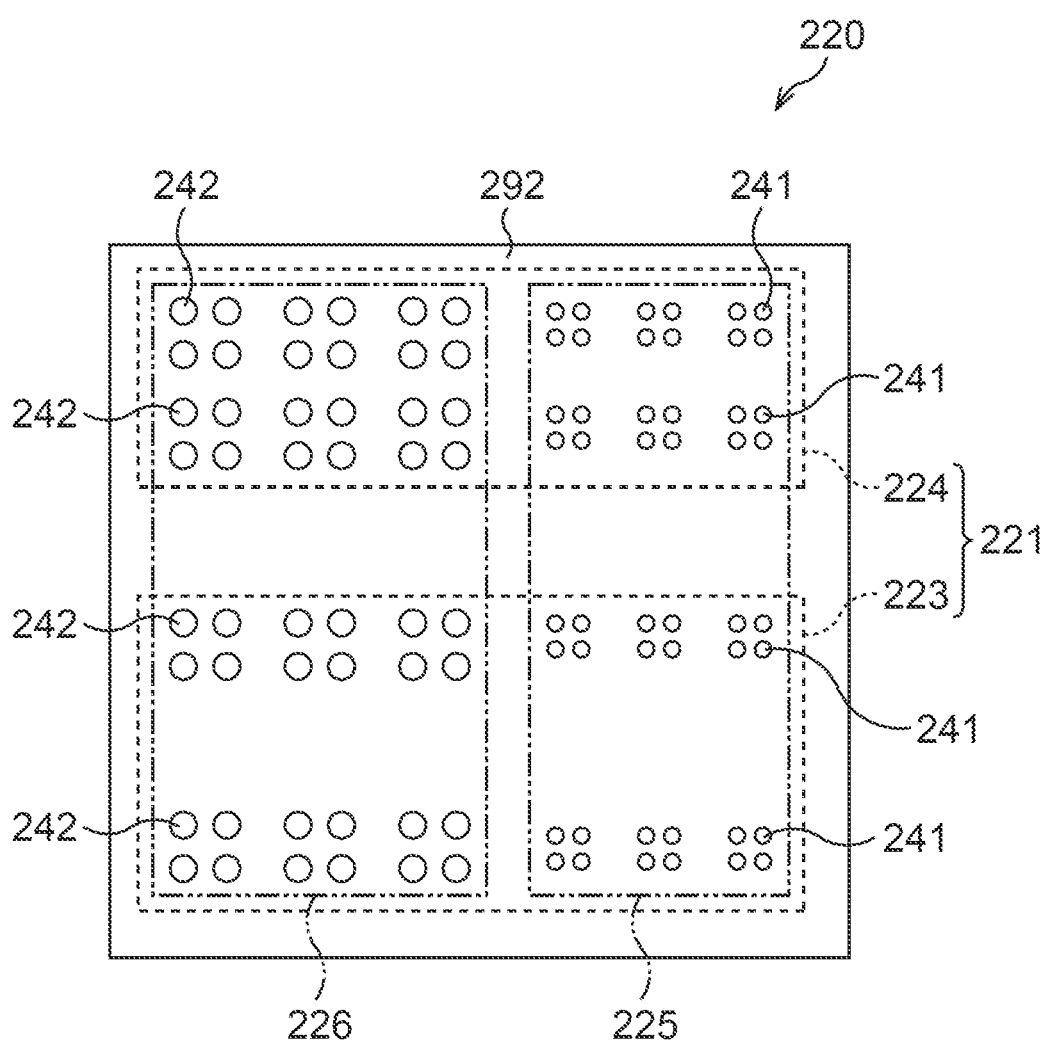
FIG. 4 is a diagram illustrating a configuration of an electronic circuit chip.

As illustrated in FIG. 4, the electronic circuit chip 220 includes an electronic circuit 221 that includes a transmitting circuit 223 and a receiving circuit 224. The transmitting circuit 223 includes a driving circuit that drives the modulator 213. The receiving circuit 224 includes a trans-impedance amplifier and a limiting amplifier. The main surface (lower surface) 292 has a region 225 to which the optical integrated circuit chip 210 is connected and a region 226 to which the through wiring board 230 is connected. The bumps 241 are connected to the transmitting circuit 223 and the receiving circuit 224 on the main surface 292 in the region 225. The bumps 242 are connected to the transmitting circuit 223 and the receiving circuit 224 on the main surface 292 in the region 226.

The transmitting circuit 223 and the receiving circuit 224 are formed on a substrate that contains silicon, for example, on a silicon substrate with a thickness of about 400 µm.

Figure 5A:
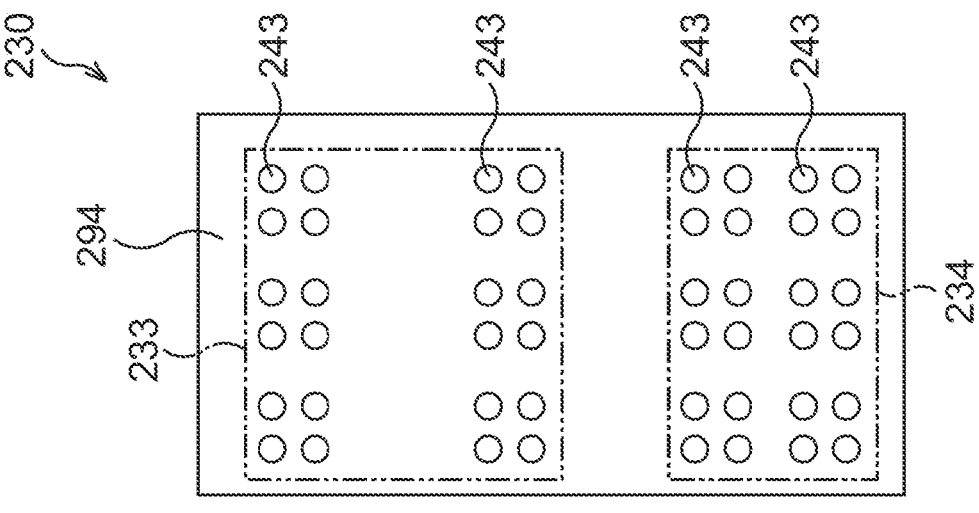
FIG. 5A to FIG. 5C are diagrams illustrating a configuration of a through wiring board.
Figure 5B:
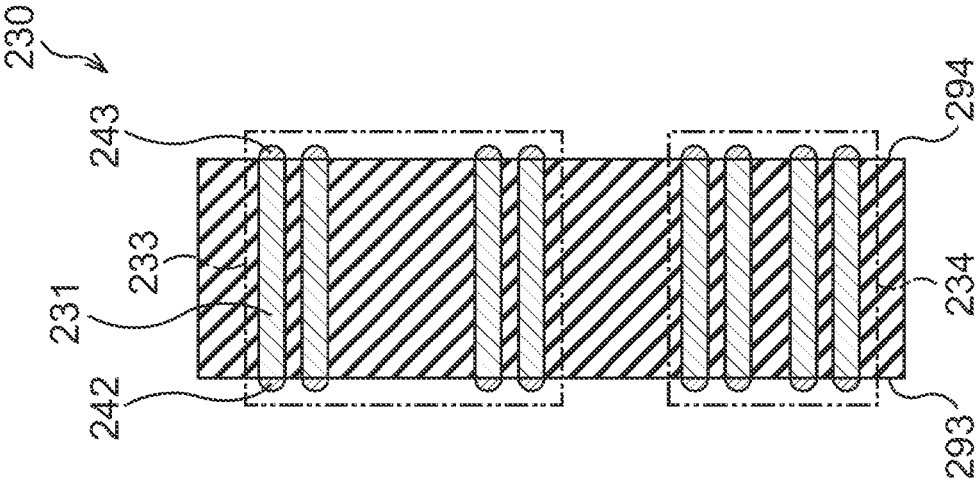
Figure 5C:
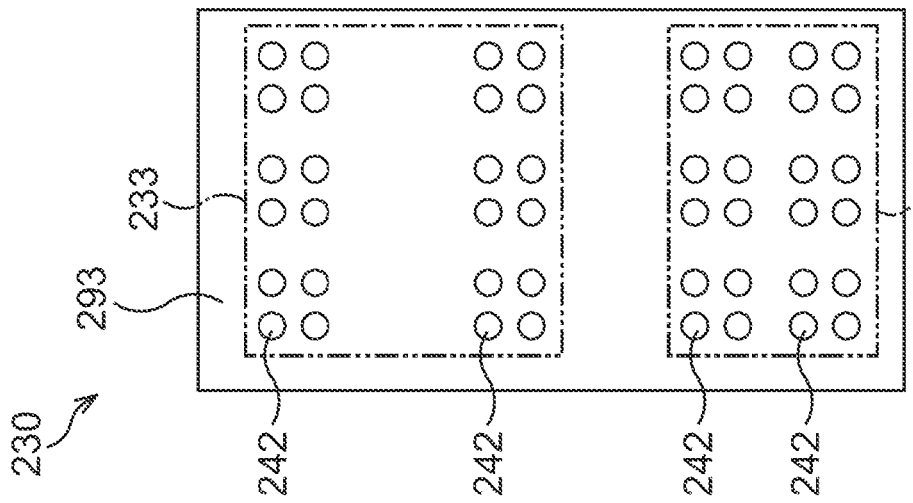

As illustrated in FIG. 5A to FIG. 5C, the through wiring board 230 includes a through wiring 231. The through wiring 231 is connected to the bump 242 on the main surface (upper surface) 293 side, and a bump 243 connected to the through wiring 231 is on the other main surface 294 (lower surface) of the through wiring board 230. The through wiring 231 has a region 233 for transmission corresponding to the transmitting circuit 223 and a region 234 for reception corresponding to the receiving circuit 224. FIG. 5A illustrates a configuration of the main surface 293, FIG. 5B is a cross-sectional view, and FIG. 5C illustrates a configuration of the main surface 294.

The through wiring 231 is formed in a glass ceramic material with a thickness of about 600 µm, for example, and the through wiring 231 is a wiring which contains Cu, for example, a Cu wiring.

For example, the bumps 241 are disposed in an array at a pitch of 50 µm, and contain Cu and SnAg solder. For example, the bumps 242 are disposed in an array at a pitch of 150 µm, and contain SnAg solder. For example, the bumps 243 are disposed in an array at a pitch of 150 µm, and contain SnAg solder. The bump 241 is an example of a first bump, the bump 242 is an example of a second bump, and the bump 243 is an example of a third bump.

A distance L1 between the main surface 292 and the other main surface 295 of the optical integrated circuit chip 210 is equal to or smaller than a distance L2 between the main surface 292 and a vertex 244 of the bump 243. The main surface 292 is an example of a first main surface, and the main surface 295 is an example of a second main surface. The distance L1 is an example of a first distance, and the distance L2 is an example of a second distance.

The optical device 200 is used while being mounted on a circuit board 250 in a manner that the bump 243 is in contact with the circuit board 250, as illustrated in FIG. 2. Since the distance L1 is equal to or smaller than the distance L2, it is possible to insert an underfill material 261 between the main surface 295 and the circuit board 250, and it is possible to surely connect all the bumps 243 to the circuit board 250. The circuit board 250 includes, for example, a high-speed transmission line, a power line, a control signal line, and so on.

The driving circuit in the transmitting circuit 223 drives the modulator 213 via the bump 241 in the optical device 200. The modulator 213 modulates light inputted from the input port via the spot-size converter 215 and the waveguide 216a and outputs the modulated light from the output port. The light outputted from the output port is outputted via the waveguide 216b and the spot-size converter 215. The light receiver 214 converts the light inputted from the input port via the spot-size converter 215 and the waveguide 216c into an electric signal. This electric signal is inputted to the receiving circuit 224 via the bump 241, and is subjected to signal processing such as amplification by the receiving circuit 224.

An electric power, a control signal, and so on are provided from the circuit board 250 via the through wiring 231 to the electronic circuit chip 220, and signals are given and received between the electronic circuit chip 220 and the circuit board 250 via the through wiring 231.

According to the second embodiment, the optical device 200 can be easily mounted on the circuit board 250, even without performing highly accurate processing of the circuit board 250. Since the optical integrated circuit chip 210, the electronic circuit chip 220, and the through wiring board 230 are connected with the bump 241, the bump 242, and the bump 243 instead of bonding wires, a degree of integration and an operation speed can be improved.

Next, a method of manufacturing the optical device 200 according to the second embodiment will be described. FIG. 6A to FIG. 6D are diagrams illustrating the method of manufacturing the optical device according to the second embodiment in sequence of process steps.

First, the optical integrated circuit chip 210, the electronic circuit chip 220, and the through wiring board 230 are fabricated individually. On this occasion, a part of bumps 241 is provided to the optical integrated circuit chip 210, and another part of the bumps 241 and a part of bumps 242 are provided to the electronic circuit chip 220. Another part of the bumps 242 and the bumps 243 are provided to the through wiring board 230.

The bumps provided to the optical integrated circuit chip 210 may be made of Cu with a height of about 10 µm and a width of about 30 µm, for example, and these bumps are provided on the modulators 213 and the light receivers 214 at a pitch of 50 µm. The bumps for the bumps 241 provided to the electronic circuit chip 220 may be made of SnAg solder with a height of about 10 µm and a width of about 30 µm, for example, and these are provided on the transmitting circuit 223 and the receiving circuit 224 at a pitch of 50 µm in the region 225, to which the optical integrated circuit chip 210 is connected. The bumps for the bumps 242 provided to the electronic circuit chip 220 may be made of SnAg solder with a height of about 10 µm and a width of about 70 µm, for example, and these are provided on the transmitting circuit 223 and the receiving circuit 224 at a pitch of 150 µm in the region 226, to which the through wiring board 230 is connected. The bumps for the bumps 242 provided to the through wiring board 230 may be made of SnAg solder with a height of about 30 µm and a width of about 70 µm, for example, and these are provided on the through wirings 231 at a pitch of 150 µm on the main surface 293 side. The bumps 243 also may be made of SnAg solder with a height of about 30 µm and a width of about 70 µm, for example, and these are provided on the through wirings 231 at a pitch of 150 µm on the main surface 294 side.

Figure 6A:
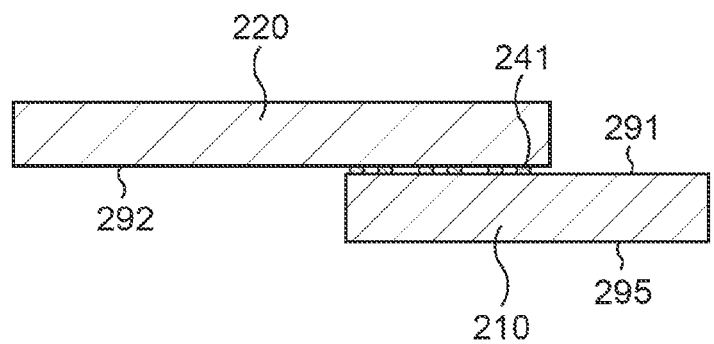
FIG. 6A to FIG. 6D are diagrams illustrating a method of manufacturing an optical device according to the second embodiment in sequence of process steps.
Figure 6B:
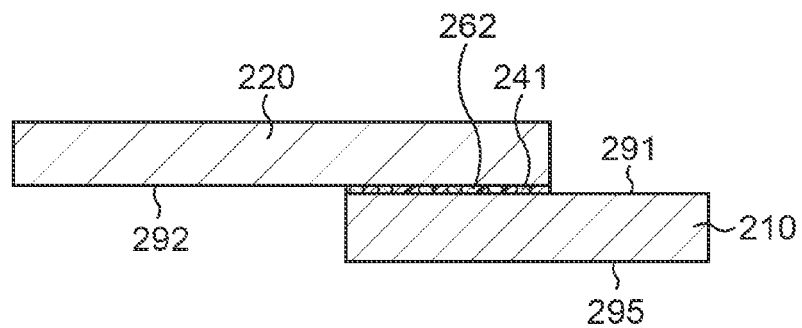
Figure 6C:
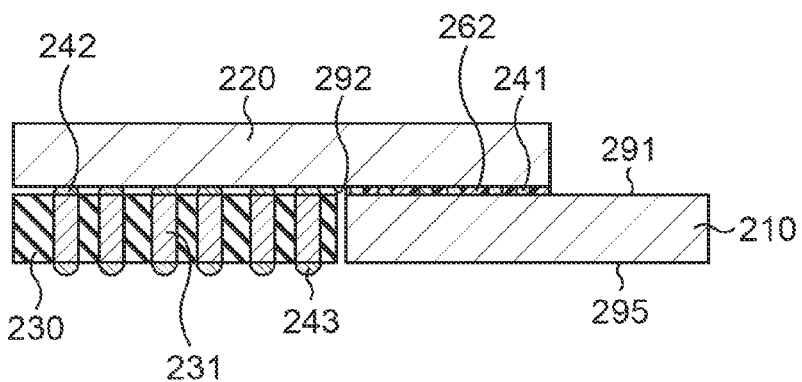
Figure 6D:
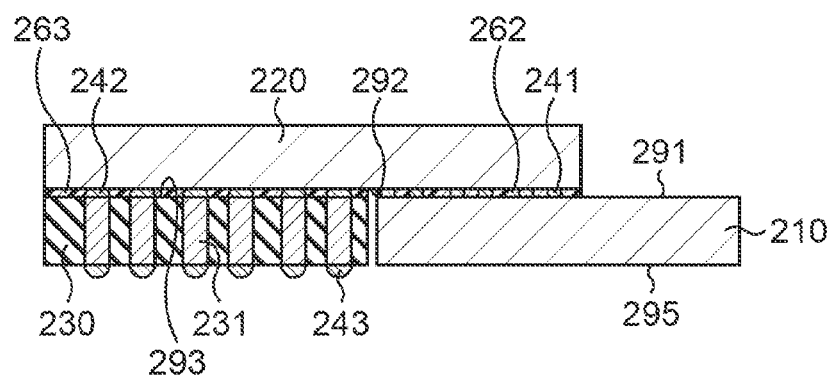

Then, as illustrated in FIG. 6A, the optical integrated circuit chip 210 and the electronic circuit chip 220 are bonded by flip-chip bonding. Thereafter, as illustrated in FIG. 6B, a space between the main surface 291 and the main surface 292 is sealed with the underfill material 262. Subsequently, as illustrated in FIG. 6C, the electronic circuit chip 220 and the through wiring board 230 are bonded by flip-chip bonding. Then, as illustrated in FIG. 6D, a space between the main surface 292 and the main surface 293 is sealed with the underfill material 263.

The optical device 200 may be manufactured as described above.

The modulators 213, the light receivers 214, the spot size converters 215, the waveguides 216a to 216c, and so on may be configured to operate on a light of a band different from the 1550 nm band. For example, these may be configured to operate on a light of a 1300 nm band.

Third Embodiment

Figure 7A:
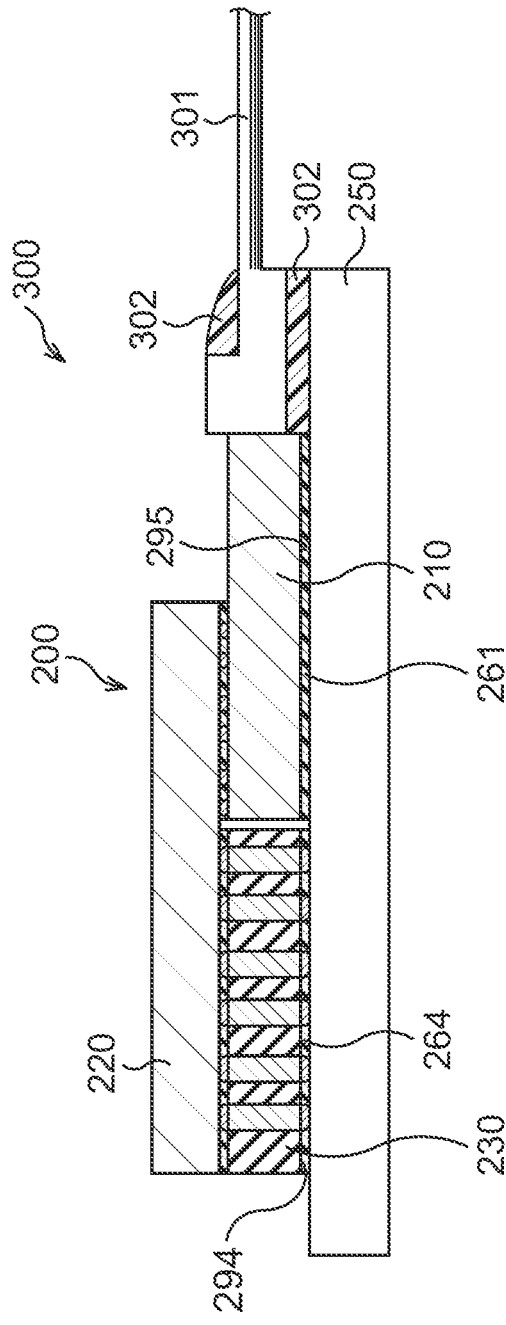
FIG. 7A and FIG. 7B are diagrams illustrating a configuration of an optical module according to a third embodiment.
Figure 7B:
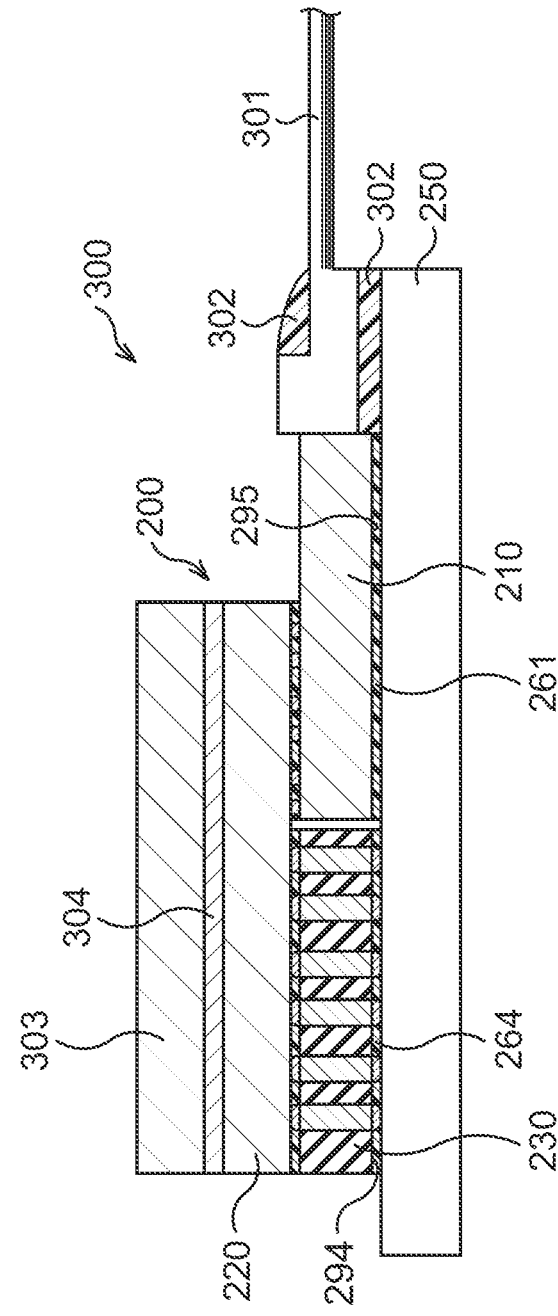

Next, a third embodiment will be described. The third embodiment relates to an optical module that includes the optical device 200. FIG. 7A and FIG. 7B are diagrams illustrating a configuration of the optical module according to the third embodiment.

In an optical module 300 according to the third embodiment, as illustrated in FIG. 7A, the optical device 200 is flip-chip mounted on the circuit board 250. The circuit board 250 includes a high-speed transmission line, a power line, and a control signal line, for example. The underfill material 261 is between the main surface 295 of the optical integrated circuit chip 210 and the circuit board 250, and an underfill material 264 is between the main surface 294 of the through wiring board 230 and the circuit board 250. An optical fiber 301 is connected to the optical interface 212 of the optical integrated circuit chip 210 and fixed by an adhesive 302.

It is unnecessary to process the circuit board 250 into a complicated shape at a high accuracy for the sake of mounting of the optical device 200 in order to manufacture the optical module 300. In other words, flip-chip mounting of the optical device 200 can be carried out easily.

It is preferable that a heat sink 303 that discharges heat generated in the electronic circuit chip 220 to the outside is provided with a thermal interface 304, as illustrated in FIG. 7B. For example, the thermal interface 304 contains In and the heat sink 303 contains Cu.

Fourth Embodiment

Figure 8:
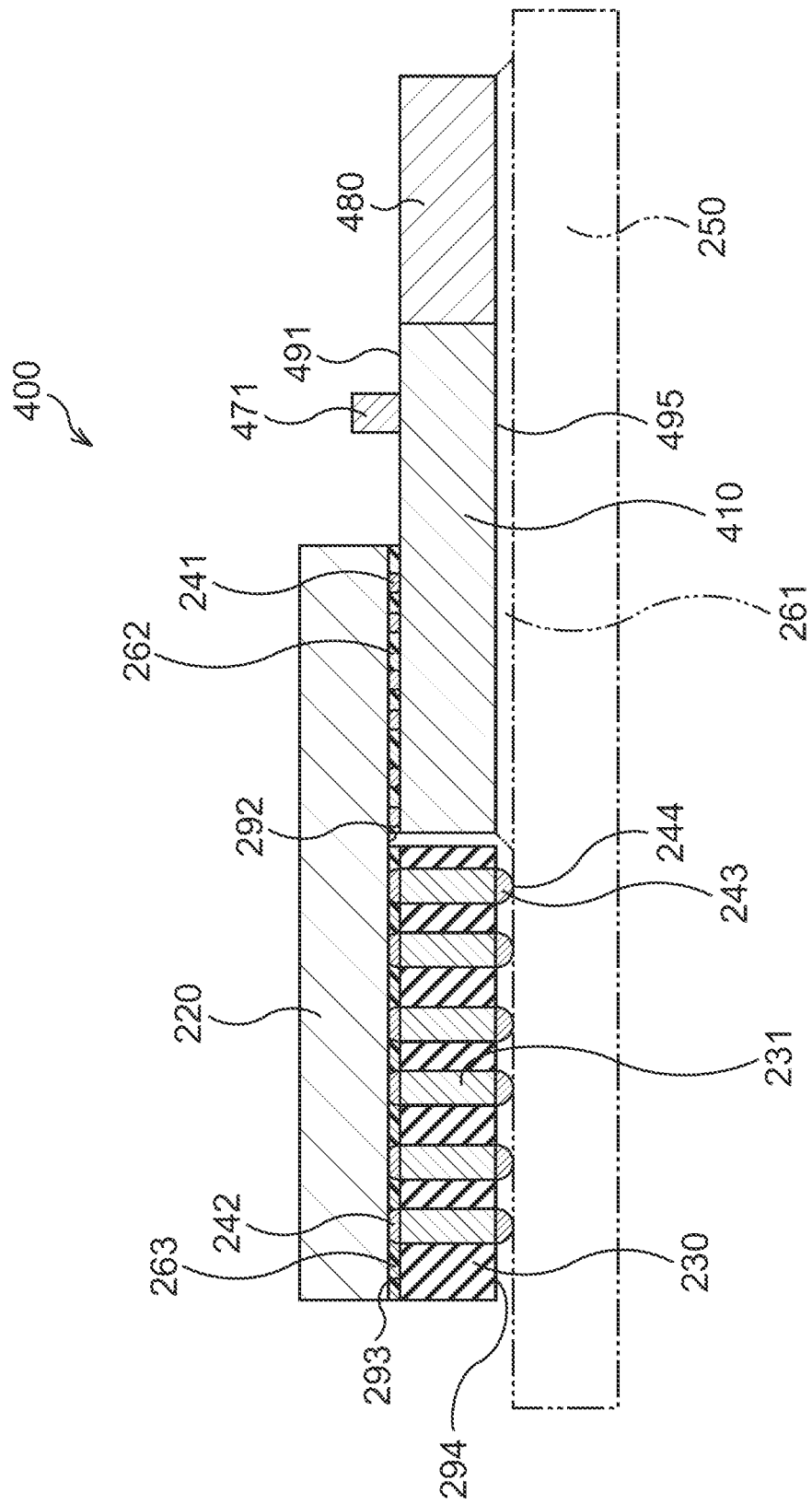
FIG. 8 is a diagram illustrating a configuration of an optical device according to a fourth embodiment.

Next, a fourth embodiment will be described. FIG. 8 is a diagram illustrating a configuration of an optical device according to the fourth embodiment.

An optical device 400 according to the fourth embodiment includes an optical integrated circuit chip 410, the electronic circuit chip 220, and the through wiring board 230, as illustrated in FIG. 8. The optical integrated circuit chip 410 and the electronic circuit chip 220 are connected by the bump 241. The electronic circuit chip 220 and the through wiring board 230 are connected by the bump 242. The bump 241 is on a main surface (upper surface) 491 of the optical integrated circuit chip 410 and on the main surface (lower surface) 292 of the electronic circuit chip 220. The bump 242 is on the main surface (lower surface) 292 of the electronic circuit chip 220 and on the main surface (upper surface) 293 of the through wiring board 230. The underfill material 262 is between the main surface 491 and the main surface 292, and the underfill material 263 is between the main surface 292 and the main surface 293.

Figure 9:
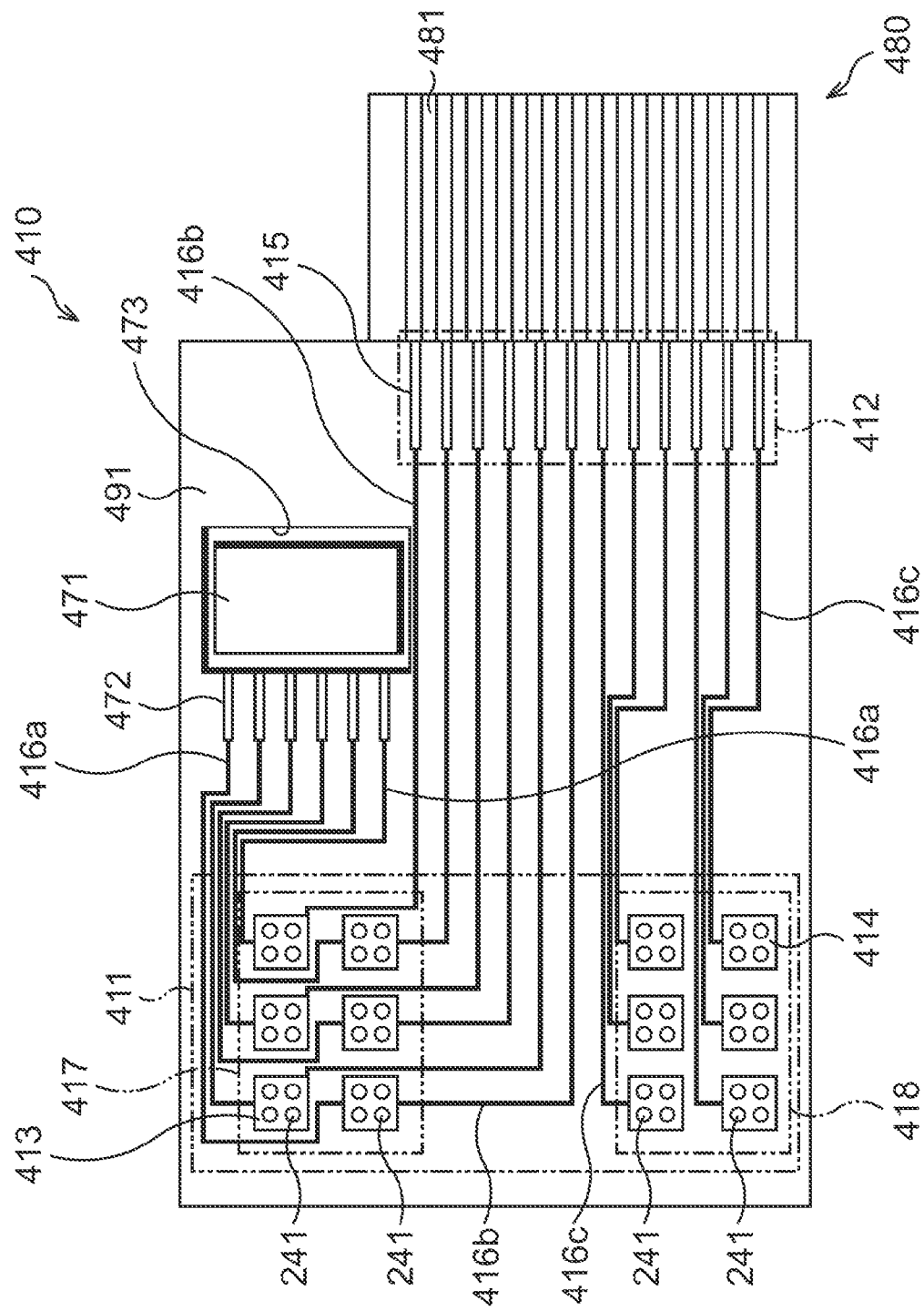
FIG. 9 is a diagram illustrating a configuration of an optical integrated circuit chip in the fourth embodiment.

As illustrated in FIG. 9, the optical integrated circuit chip 410 includes an optical integrated circuit 411 that includes a plurality of modulators 413 and a plurality of light receivers 414, and an optical interface 412 that includes a plurality of spot-size converters 415. The modulators 413 are included in a modulator section 417, and disposed in an array in the modulator section 417. The light receivers 414 are included in a light receiver section 418, and disposed in an array in the light receiver section 418. The bumps 241 are connected to the modulators 413 and the light receivers 414 on the main surface 491 side. The optical integrated circuit chip 410 also includes a light source chip 471 and a spot-size converter 472 to which light emitted from the light source chip 471 is inputted. The light source chip 471 is disposed within a recessed part 473 formed in the main surface 491 for an optical axis of the light emitted from the light source chip 471 to coincide with an input section of the spot size converter 472. For example, the light source chip 471 is connected to an electric wiring on the optical integrated circuit chip 410 via a solder bump, and the electric wiring is connected to a light source chip driving circuit on the electronic circuit chip via the bump 241. Each of the modulators 413 includes an input port of light and an output port of light, an end of a waveguide 416a is connected to the input port, and an end of a waveguide 416b is connected to the output port. Each of the light receivers 414 includes an input port of light, and an end of a waveguide 416c is connected to the input port. The other end of the waveguide 416a is connected to the spot-size converter 472, and the other ends of the waveguide 416b and the waveguide 416c are connected to the spot-size converter 415.

The modulators 413, the light receivers 414, the spot-size converters 415, the waveguides 416a to 416c, and the spot-size converter 472 are formed on a substrate that contains silicon, for example, on an SOI substrate with a thickness of about 530 μm, for example. The modulator 413 is a modulator of a Mach-Zehnder interferometer type, for example, and the light receiver 414 is a light receiver of a waveguide type whose absorbing layer is of Ge, for example. The spot-size converter 415 and the spot-size converter 472 includes waveguides made of SiON whose refractive index is 1.47, for example, and shift light from the silicon waveguides 416a to 416c and input/output light from end surfaces. The present embodiment may be configured so that the modulators 413, the light receivers 414, the spot-size converters 415, the waveguides 416a to 416c, and the spot-size converter 472 operate on a light of a 1550 nm band, for example. The light source chip 471 may be a distributed feedback (DFB) laser array which includes an InP substrate and oscillate at the 1550 nm band, for example.

The optical device 400 includes a guide chip 480 that guides an optical fiber. A groove 481 whose cross-sectional shape is of a V-letter shape and in which the optical fiber is disposed is formed in the guide chip 458 so as to correspond to the spot-size converter 415. The guide chip 480 is bonded to the optical interface 412 with an adhesive in a manner that a core of the optical fiber disposed on the groove 481 is connected to the waveguide of the spot-size converter 415. The guide chip 480 is formed by anisotropically etching a silicon substrate, for example.

Configurations of the electronic circuit chip 220, the through wiring board 230, the bump 241, the bump 242, and the bump 243 are similar to those in the second embodiment. A distance L1 between the main surface 292 and the other main surface 495 of the optical circuit chip 410 is equal to or smaller than the distance L2 between the main surface 292 and a vertex 244 of the bump 243.

The optical device 400 is used while being mounted on the circuit board 250 in a manner that the bump 243 is in contact with the circuit board 250, as illustrated in FIG. 8. Since the distance L1 is equal to or smaller than the distance L2, it is possible to insert the underfill material 261 between the main surface 495 and the circuit board 250, and it is possible to surely connect all the bumps 243 to the circuit board 250. The circuit board 250 includes, for example, a high-speed transmission line, a power line, a control signal line, and so on.

According to the fourth embodiment also, the optical device 400 can be easily mounted on the circuit board 250, even without performing highly accurate processing of the circuit board 250. Since the optical integrated circuit chip 410, the electronic circuit chip 220, and the through wiring board 230 are connected with the bump 241, the bump 242, and the bump 243 instead of bonding wires, a degree of integration and an operation speed can be improved.

Next, a method of manufacturing the optical device 400 according to the fourth embodiment will be described. FIG. 10A to FIG. 10D are diagrams illustrating the method of manufacturing an optical device according to the fourth embodiment in sequence of process steps.

First, the optical integrated circuit chip 410, the guide chip 480, the electronic circuit chip 220, and the through wiring board 230 are fabricated individually. On this occasion, a part of the bumps 241 is provided to the optical integrated circuit chip 410, and another part of the bumps 241 and a part of the bumps 242 are provided to the electronic circuit chip 220. Another part of the bumps 242 and the bumps 243 are provided to the through wiring board 230.

The bumps provided to the optical integrated circuit chip 410 may be made of Cu with a height of about 10 μm and a width of about 30 μm, for example, and these bumps are provided on the modulators 413 and the light receivers 414 at a pitch of 50 μm. The bumps provided to the electronic circuit chip 220 and the bumps provided to the through wiring board 230 are similar to those in the second embodiment. The guide chip 480 is bonded to the optical integrated circuit chip 410 and the light source chip 471 is mounted on the optical integrated circuit chip 410.

Figure 10A:
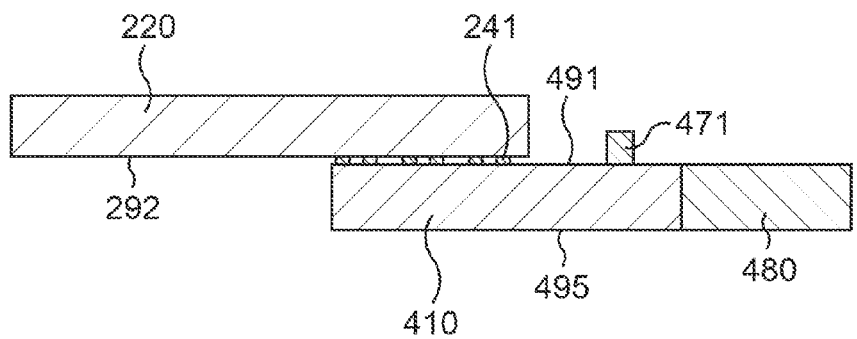
FIG. 10A to FIG. 10D are diagrams illustrating a method of manufacturing an optical device according to the fourth embodiment in sequence of process steps.
Figure 10B:
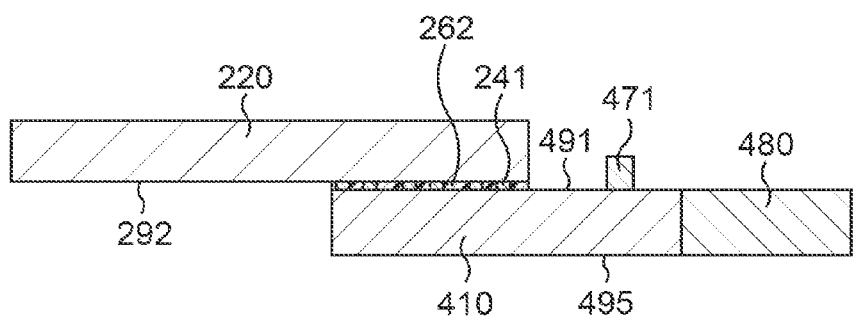
Figure 10C:
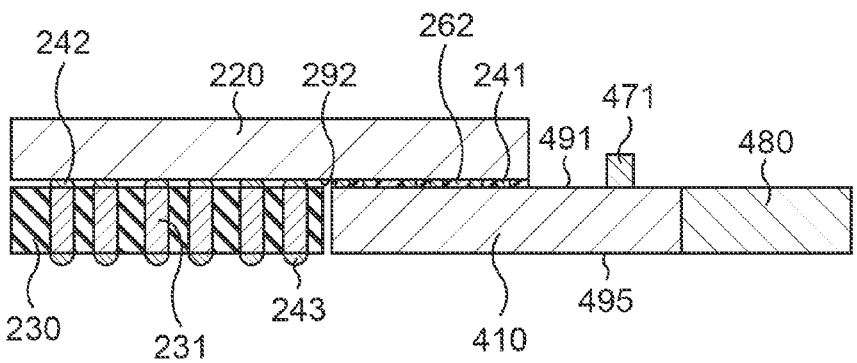
Figure 10D:
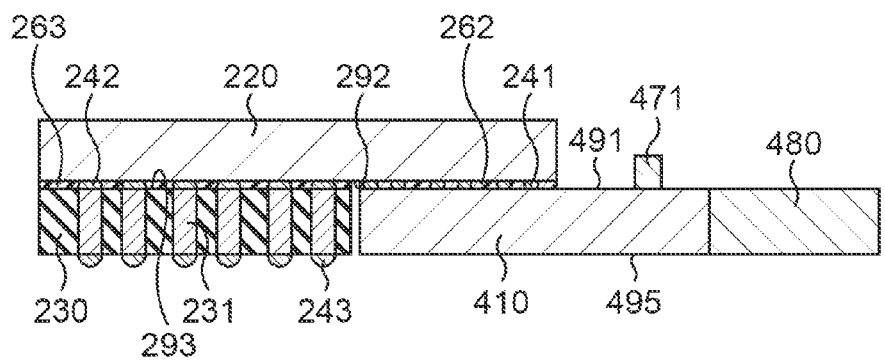

Then, as illustrated in FIG. 10A, the optical integrated circuit chip 410 and the electronic circuit chip 220 are bonded by flip-chip bonding. Thereafter, as illustrated in FIG. 10B, a space between the main surface 491 and the main surface 292 is sealed with the underfill material 262. Subsequently, as illustrated in FIG. 10C, the electronic circuit chip 220 and the through wiring board 230 are bonded by flip-chip bonding. Then, as illustrated in FIG. 10D, a space between the main surface 292 and the main surface 293 is sealed with the underfill material 263.

The optical device 400 may be manufactured as described above.

The modulators 413, the light receivers 414, the spot size converters 415, the waveguides 416a to 416c, the spot-size converter 472, and so on may be configured to operate on a light of a band different from the 1550 nm band. The light source chip 471 may oscillate at a band different from the 1550 nm band. For example, the light source chip 471 may include a GaAs substrate or a Si substrate. An emission wavelength of the light source chip 471 is preferable to be longer in order to reduce a loss in the waveguide, and is preferable to be a wavelength longer than 1127 nm being a band gap of silicon.

Fifth Embodiment

Figure 11A:
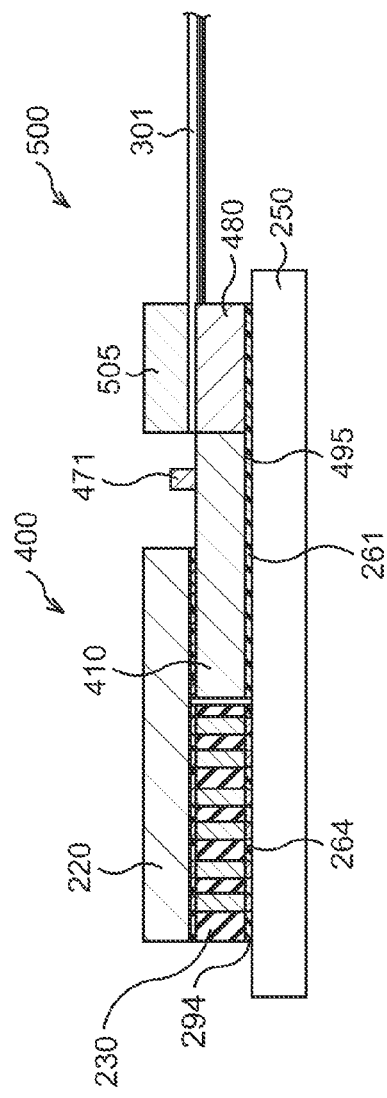
FIG. 11A to FIG. 11C are diagrams illustrating a configuration of an optical module according to a fifth embodiment.
Figure 11B:
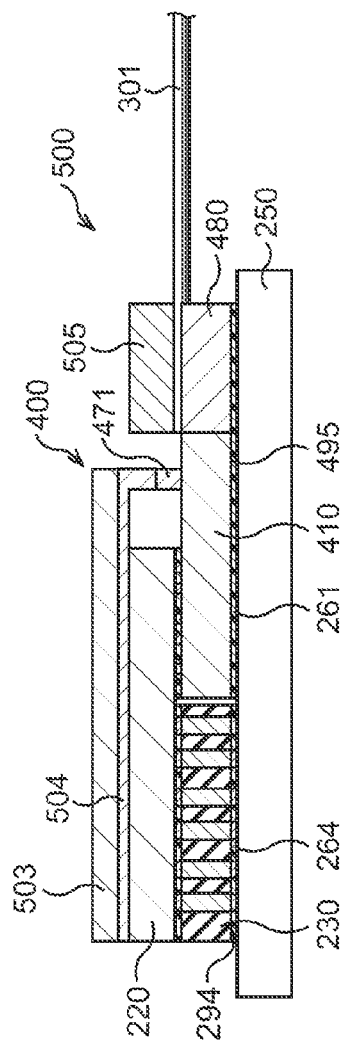
Figure 11C:
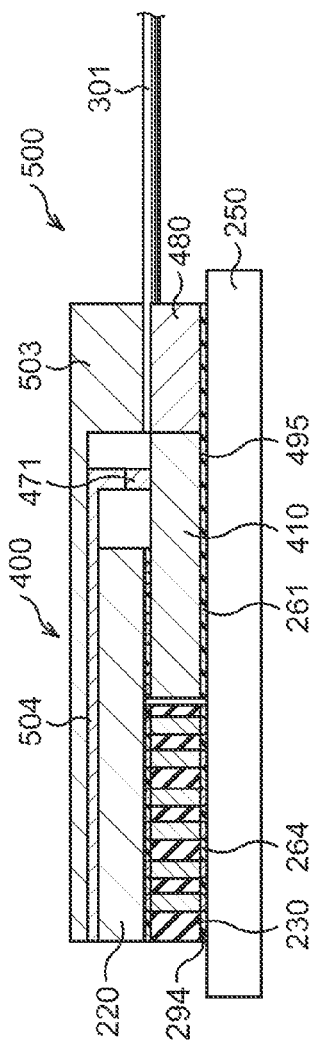

Next, a fifth embodiment will be described. The fifth embodiment relates to an optical module which includes the optical device 400. FIG. 11A to FIG. 11C are diagrams illustrating a configuration of the optical module according to the fifth embodiment.

In an optical module 500 according to the fifth embodiment, as illustrated in FIG. 11A, the optical device 400 is flip-chip mounted on the circuit board 250. The circuit board 250 includes a high-speed transmission line, a power line, and a control signal line, for example. The underfill material 261 is between the main surface 495 of the optical integrated circuit chip 410 and the circuit board 250, and the underfill material 264 is between the main surface 294 of the through wiring board 230 and the circuit board 250. The optical fiber 301 is disposed on the groove 481 of the guide chip 480 and connected to the optical interface 212 of the optical integrated circuit chip 410. The optical fiber 301 is fixed to the groove 481 by a fixing member 505.

It is unnecessary to process the circuit board 250 into a complicated shape at a high accuracy for the sake of mounting of the optical device 400 in order to manufacture the optical module 500. In other words, flip-chip mounting of the optical device 400 can be carried out easily.

It is preferable that a heat sink 503 that discharges heat generated in the electronic circuit chip 220 and heat generated in the light source chip 471 to the outside is provided with a thermal interface 504, as illustrated in FIG. 11B. The heat sink 503 may also serve as the fixing member 505, as illustrated in FIG. 11C. For example, the thermal interface 504 includes In and the heat sink 503 includes Cu.

A thickness of a substrate used for the optical integrated circuit chip 210 or the optical integrated circuit chip 410 may be larger than 530 μm or smaller than 530 μm. When an SOI substrate is used, the SOI substrate is apt to warp if a stress-relief layer provided in a rear surface is removed, and thus it is preferable to use the SOI substrate without removing the stress-relief layer. As a bump provided to the optical integrated circuit chip 210 or the optical integrated circuit chip 410, a bump made of SnAg solder, a bump made of Au, or the like may be used instead of the bump made of Cu.

As the modulator 213, a modulator of a Mach-Zehnder interferometer type, an optical modulator that uses electroabsorption, or the like, may be used instead of the modulator of the ring resonator type oscillator. As the modulator 413, a modulator of a ring resonator type, an optical modulator that uses electroabsorption, or the like, may be used instead of the modulator of the Mach-Zehnder interferometer type. When the modulator of the ring resonator type is used, it is preferable that a phase controller (for example, a heater) that controls a resonant wavelength of the ring resonator is provided. It is because a stable operation is possible without depending on a wavelength of inputted laser light.

As a material of the waveguide of the spot-size converter 215 or the spot-size converter 415, a silicon oxide, silica to which germanium is doped, or the like, may be used instead of SiON. A taper structure may be provided into the waveguides 216a to 216c or the waveguides 416a to 416c to use that part as the spot-size converter 215 or the spot-size converter 415. A grating coupler that inputs/outputs light from an upper surface of a substrate may be used for the spot-size converter 215 or the spot-size converter 415. A grating coupler may be used for input/output of light from the modulator 213 or the modulator 413, and a surface-type light receiver may be used as the light receiver 214 or the light receiver 414. In this case, the light receiver 214 or the light receiver 414 receives light irradiated on the upper surface of the substrate, the light receiver 214 or the light receiver 414 also serves as an optical interface, and the optical fiber 301 is connected to the main surface 291 or the main surface 491.

A taper structure may be provided into the waveguide 416a to use that part as the spot-size converter 472. A grating coupler that inputs/outputs light from an upper surface of a substrate may be used for the spot-size converter 472. In this case, the recessed part 473 is unnecessary to be formed, and, for example, a structure of the light source chip 471 is made to a structure in which light is emitted from its upper surface or lower surface, or the light source chip 471 is disposed to stand on the main surface 491 so that light is emitted downward.

Figure 12A:
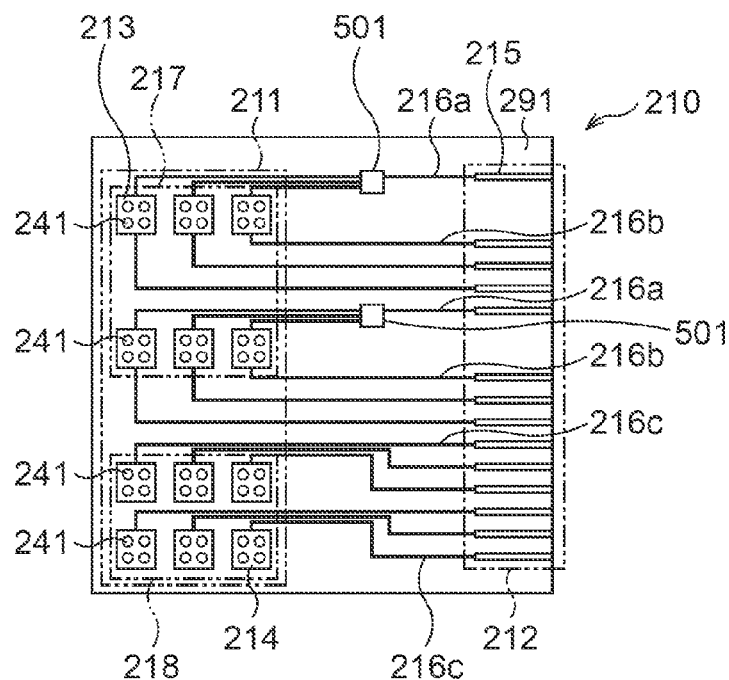
FIG. 12A and FIG. 12B are diagrams illustrating modified examples of the second and fourth embodiments, respectively.
Figure 12B:
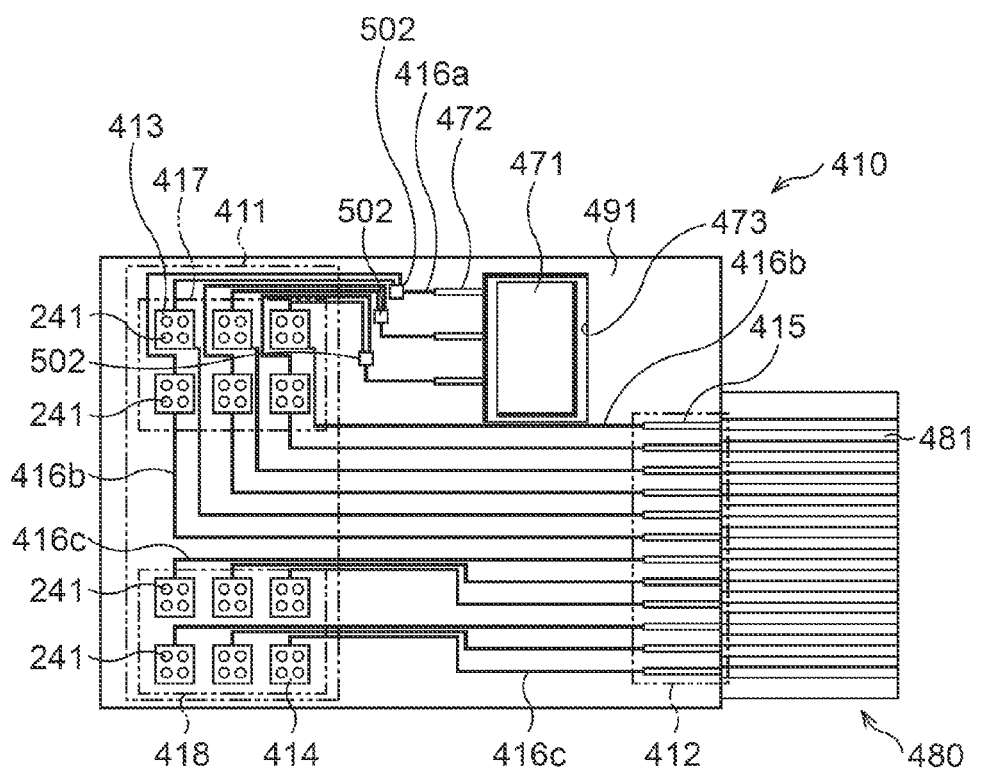

An optical branching structure may be between the input port of the modulator 213 or the modulator 413 and the spot-size converter 215 or the spot-size converter 472. In this case, light can be inputted from one spot-size converter 215 or spot-size converter 472 to a plurality of modulators 213 or modulators 413. For example, as illustrated in FIG. 12A, when two optical branching structures 501 (splitter) are provided, it is possible to input light from two spot-size converters 215 to six modulators 213. As illustrated in FIG. 12B, when three optical branching structures 502 are provided, it is possible to input light from three spot-size converters 472 to six modulators 413.

A thickness of a substrate used for the electronic circuit chip 220 may be larger than 400 μm or smaller than 400 μm. As the bump provided to the electronic circuit chip 220, a bump made of Cu or a bump made of Au may be used instead of the bump made of SnAg solder.

A thickness of a base material of the through wiring board 230, for example, a glass ceramic material, is not limited to 600 μm. As the bump provided to the through wiring board 230, a bump made of Cu or a bump made of Au may be used, instead of the bump made of SnAg solder.

Figure 13:
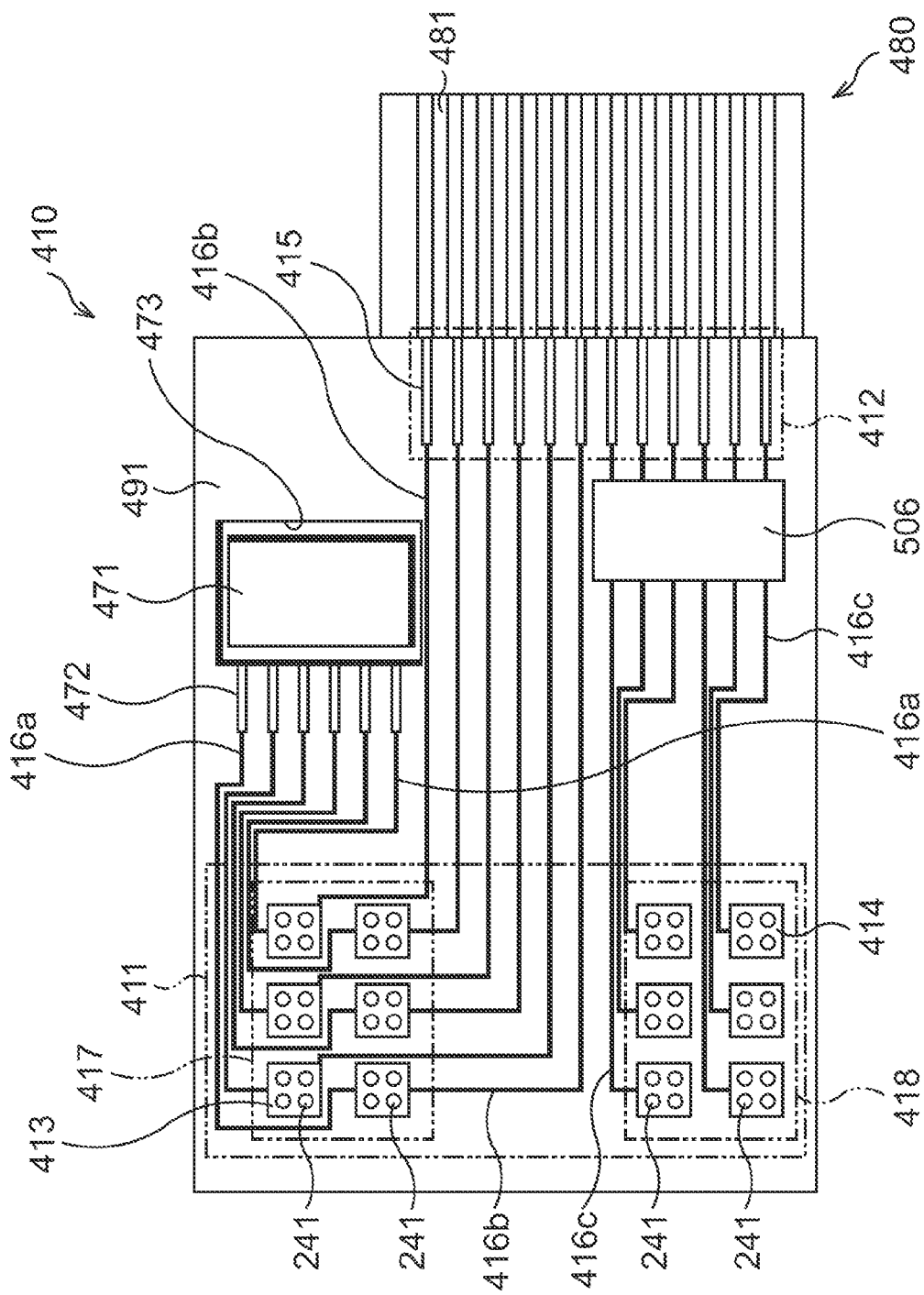
FIG. 13 is a diagram illustrating another modified example of the fourth embodiment.

As illustrated in FIG. 13, the optical integrated circuit chip 410 of the optical device 400 according to the fourth embodiment may include a semiconductor optical amplifier (SOA) 506. The semiconductor optical amplifier 506 is disposed between the light receiver 414 and the spot-size converter 415. In a case where the semiconductor optical amplifier 506 is disposed, even if a loss of link is large, transmission compensating the link loss can be carried out.

In the second to fifth embodiments, as long as the transmitting circuit 223 and a composition used for giving and receiving of a signal therebetween are provided, it suffices if the receiving circuit 224 and a composition used for giving and receiving of a signal therebetween are not provided. Similarly, as long as the receiving circuit 224 and the composition used for giving and receiving of a signal therebetween are provided, it suffices if the transmitting circuit 223 and the composition used for giving and receiving of a signal therebetween are not provided. In either case, there can be obtained an effect that mounting on the circuit board can be carried out easily and a high operation speed is obtained. The effect can be obtained also in a case where another function circuit such as an optical switch is provided.

Though a size of each bump is not limited in particular, the first bump between the optical integrated circuit chip and the electronic circuit chip is preferable to be smaller than the second bump between the electronic circuit chip and the through wiring board and the third bump on the opposite side of the through wiring board. This is because the optical integrated circuit chip and the electronic circuit chip can be mutually constituted with a material of the same kind, for example, silicon, as a primary material, the electronic circuit chip and the through wiring board are hard to be mutually constituted with a material of the same kind as a primary material. In other words, if a kind of primary materials is the same, displacement in mounting is hard to occur so that a small bump can be used, since thermal expansion coefficients are equivalent.

Bonding of the optical integrated circuit chip and the electronic circuit chip may be carried out after mounting of the electronic circuit chip and the through wiring board, but is preferable to be carried out before mounting of the electronic circuit chip and the through wiring board, if the first bump is smaller than the second bump and the third bump.

It is unnecessary that the through wiring linearly penetrates between both main surfaces of the through wiring board, and the through wiring may be routed in the through wiring board.

According to the above-described optical device and so on, mounting on the circuit board can be carried out easily while obtaining a high operation speed, since a relationship among the optical integrated circuit chip, the electronic circuit chip, and the through wiring board is appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical device comprising:
   an optical integrated circuit chip that comprises an optical integrated circuit and an optical interface connected thereto;
   an electronic circuit chip that comprises an electronic circuit connected to the optical integrated circuit;
   a through wiring board that comprises a through wiring connected to the electronic circuit chip;
   a first bump that connects the optical integrated circuit and the electronic circuit between the optical integrated circuit chip and the electronic circuit chip;
   a second bump that connects the electronic circuit and the through wiring between the electronic circuit chip and the through wiring board; and
   a third bump connected to an end portion on an opposite side to the second bump of the through wiring,
   wherein the optical integrated circuit chip and the through wiring board are disposed on a side of a first main surface of the electronic circuit chip, and
   wherein a first distance between the first main surface and a second main surface of the optical integrated circuit chip, the second main surface being on an opposite side to the electronic circuit chip, is equal to or smaller than a second distance between the first main surface and a vertex of the third bump, the vertex being on an opposite side to the electronic circuit chip.

2. The optical device according to claim 1,
   wherein the optical integrated circuit comprises a modulator, and
   wherein the electronic circuit comprises a driving circuit that drives the modulator.

3. The optical device according to claim 2, comprising a light source chip that supplies a light to the modulator.

4. The optical device according to claim 1,
   wherein the optical integrated circuit comprises a light receiver, and
   wherein the electronic circuit comprises a receiving circuit that receives an electric signal from the light receiver.

5. The optical device according to claim 4, comprising an optical amplifier between the light receiver and the optical interface.

6. The optical device according to claim 1, comprising a guide chip that guides an optical fiber connected to the optical interface.

7. An optical module comprising:
   a circuit board; and
   an optical device mounted on the circuit board,
   wherein the optical device comprising:
   an optical integrated circuit chip that comprises an optical integrated circuit and an optical interface connected thereto;
   an electronic circuit chip that comprises an electronic circuit connected to the optical integrated circuit;
   a through wiring board that comprises a through wiring connected to the electronic circuit chip;

a first bump that connects the optical integrated circuit and the electronic circuit between the optical integrated circuit chip and the electronic circuit chip;

a second bump that connects the electronic circuit and the through wiring between the electronic circuit chip and the through wiring board; and a third bump connected to an end portion on an opposite side to the second bump of the through wiring, wherein the optical integrated circuit chip and the through wiring board are disposed on a side of a first main surface of the electronic circuit chip, wherein a first distance between the first main surface and a second main surface of the optical integrated circuit chip, the second main surface being on an opposite side to the electronic circuit chip, is equal to or smaller than a second distance between the first main surface and a vertex of the third bump, the vertex being on an opposite side to the electronic circuit chip, wherein the third bump is connected to the circuit board, and wherein an underfill material is provided between the second main surface and the circuit board.

* * * * *